(12) United States Patent
Cavanna et al.

(10) Patent No.: US 6,208,703 B1
(45) Date of Patent: Mar. 27, 2001

(54) FIRST-IN-FIRST-OUT SYNCHRONIZER

(75) Inventors: Vincente V. Cavanna, Loomis; Joseph H. Steinmetz, Rocklin, both of CA (US)

(73) Assignee: Hewlett Packard Company, Palo Alto, CA (US)

( * ) Notice: Subject to any disclaimer, the term of this patent is extended or adjusted under 35 U.S.C. 154(b) by 0 days.

(21) Appl. No.: 09/080,035

(22) Filed: May 15, 1998

(51) Int. Cl.[7] ..................................................... H04L 7/00

(52) U.S. Cl. ............................ 375/372; 709/400; 713/400

(58) Field of Search .............................. 365/78; 711/116; 375/354, 371, 372, 356; 713/400; 370/503; 327/141; 709/400

(56) References Cited

U.S. PATENT DOCUMENTS

| 4,694,426 | * | 9/1987 | Mason ...................................... 365/78 |
| 4,873,703 | | 10/1989 | Crandall et al. ...................... 375/371 |
| 5,267,191 | * | 11/1993 | Simpson ................................ 365/78 |
| 5,809,521 | * | 9/1998 | Steinmetz et al. .................... 711/116 |

OTHER PUBLICATIONS

Vince Cavanna, *The FIFO/Synchronizer: A Novel FIFO Architecture with Robust Performance as a Synchronizer*, Proceedings of On–Chip System Design Conference, Design Supercon97.

* cited by examiner

*Primary Examiner*—Stephen Chin
*Assistant Examiner*—Chieh M. Fan

(57) ABSTRACT

A one stage first-in-first-out synchronizer includes a producer side and a consumer side. The producer side includes a first write buffer, a not full output, a write input, a second write buffer and a write clock input. The first write buffer stores a write pointer. The not full output indicates whether new data may be written. The write input is asserted to write data. The second write buffer receives as input a read pointer. The write clock input is used to provide a clock signal to the first write buffer and the second write buffer. The consumer side includes a first read buffer, a not empty output, a read input, a second read buffer, and a read clock input. The first read buffer stores the read pointer. The not empty output indicates whether stored data may be read. The read input is asserted to read data. The second read buffer receives as input the write pointer. The read clock input is used to provide a clock signal to the first write buffer and the second write buffer.

20 Claims, 11 Drawing Sheets

FIRST-IN-FIRST-OUT SYNCHRONIZER

BACKGROUND

The present invention concerns data communication and pertains particularly to a first-in-first-out synchronizer.

When a circuit interfaces two separate systems with non-correlated and non-synchronous clocks, metastable states can result when a signal from one system is sampled using the clock from the other system. This happens, for example, when a signal from the first system is sampled with the clock of the second system when the signal from the first system is in transition.

In order to alleviate the metastable problem, synchronization circuits are used to provide synchronization for systems with non-correlated and non-synchronous clocks.

Generally the synchronization systems provide a handshake that is independent of the phase and frequency of the producer and consumer clocks.

The conventional way of performing this handshaking process is to fully interlock, via two signals that cross the clock boundary and that must therefore be synchronized, the producer and consumer state machines. The design of these state machines is tricky and has the potential to create subtle problems especially when it is important to operate the handshake at the maximum possible rate.

This interlocking is needed not only in the case where the two clocks are asynchronous but also when two clocks differ in frequency so that one period in a clock domain corresponds to a different number of periods in the other clock domain.

One system that provides for synchronization is set out in U.S. Pat. No. 4,873,703, issued to Douglas Crandall et al., for SYNCHRONIZING SYSTEM. This system provides for reliably passing data across a boundary between two independent, not-correlated clocks. The system reduces occurrence of errors due to asynchronous samplings. The system is implemented as a two port memory and performs a handshake between the two non-correlated clock systems. For further information on synchronizing system of these types, see also, Vince Cavanna, *The FIFO/Synchronizer: A Novel FIFO Architecture with Robust Performance as a Synchronizer*, Proceedings of On-Chip System Design Conference, Design Supercon97.

SUMMARY OF THE INVENTION

In accordance with the preferred embodiment of the present invention, a one stage first-in-first-out synchronizer is presented. The one stage first-in-first-out synchronizer includes a producer side and a consumer side. The producer side includes a first write buffer, a not full output, a write input, a second write buffer and a write clock input. The first write buffer stores a write pointer. The not full output indicates whether new data may be written. The write input is asserted to write data. The second write buffer receives as input a read pointer. The write clock input is used to provide a clock signal to the first write buffer and the second write buffer. The consumer side includes a first read buffer, a not empty output, a read input, a second read buffer, and a read clock input. The first read buffer stores the read pointer. The not empty output indicates whether stored data may be read. The read input is asserted to read data. The second read buffer receives as input the write pointer. The read clock input is used to provide a clock signal to the first write buffer and the second write buffer.

The one stage first-in-first-out synchronizer includes, for example, a register for buffering data. The register includes a clock input, connected to the write clock input, and a load input connected to an input of the first write buffer. Alternatively, the register for buffering data may be located external to the one stage first-in-first-out synchronizer. The one stage first-in-first-out synchronizer may also be utilized where there is no data buffering but data is transferred directly from a producer to a consumer without buffering the data.

In a first preferred embodiment of the present invention, the one stage first-in-first-out synchronizer includes a first write flip-flop, a first read flip-flop, a second write flip-flop, a second read flip-flop, a write clock input, a write input, a not full output, first write logic gating means, second write logic gating means, a read clock input, a read input, a not empty output, first read logic gating means, and second read logic gating means.

The first write flip-flop generates a write pointer. The first read flip-flop generates a read pointer. The second write flip-flop receives as input the read pointer. The second read flip-flop receives as input the write pointer. The write clock input provides a write clock signal to the first write flip-flop and the second write flip-flop. The first write logic gating means is for generating the not full output from the write pointer and an output of the second write flip-flop. The second write logic gating means is for generating an input to the first write flip-flop from the write input and the not full output. The read clock input provides a read clock signal to the first read flip-flop and the second read flip-flop. The first read logic gating means is for generating the not empty output from the read pointer and an output of the second read flip-flop. The second read logic gating means is for generating an input to the first read flip-flop from the read input and the not empty output.

For example, the first write flip-flop is a toggle (T) flip-flop, the second write flip-flop is a delay (D) flip-flop, the first read flip-flop is a T flip-flop, and the second read flip-flop is a D flip-flop. In a preferred embodiment, the first write logic gating means includes a logic NOT gate which has an input connected to the output of the second write flip flop. The first write logic gating means also includes a first logic XOR means having a first input connected to an output of the logic NOT gate, a second input connected to the write pointer, and an output which generates the not full output. The first read logic gating means includes a first logic XOR gate having a first input connected to the output of the second read flip-flop, a second input connected to the read pointer, and an output which generates the not empty output. The second write logic gating means includes a first logic AND gate having a first input connected to the write input, a second input connected to the not full output, and an output connected to the input of the first write flip-flop. The second read logic gating means includes a second logic AND gate having a first input connected to the read input, a second input connected to the not empty output, and an output connected to the input of the first read flip-flop.

In a second preferred embodiment of the present invention, the one stage first-in-first-out synchronizer includes a first write flip-flop, a first read flip-flop, a second write flip-flop, a second read flip-flop, a third write flip-flop, a third read flip-flop, a write clock input, a write input, a not full output, first write logic gating means, second write logic gating means, a read clock input, a read input, a not empty output, first read logic gating means, and second read logic gating means.

The first write flip-flop generates a write pointer. The first read flip-flop generates a read pointer. The second write flip-flop receives as input the read pointer. The second read flip-flop receives as input the write pointer. The third write flip-flop has an input coupled to an output of the second write flip-flop. The third read flip-flop has an input coupled to an output of the second read flip-flop. The write clock input provides a write clock signal to the first write flip-flop, the second write flip-flop and the third write flip-flop. The first write logic gating means is for generating the not full output from the write pointer and an output of the third write flip-flop. The second write logic gating means is for generating an input to the first write flip-flop from the write input and the not full output. The read clock input provides a read clock signal to the first read flip-flop, the second read flip-flop and the third read flip-flop. The first read logic gating means is for generating the not empty output from the read pointer and an output of the third read flip-flop. The second read logic gating means is for generating an input to the first read flip-flop from the read input and the not empty output.

For example, the first write flip-flop is a toggle (T) flip-flop, the second write flip-flop is a delay (D) flip-flop, the third write flip-flop is a delay (D) flip-flop, the first read flip-flop is a T flip-flop, the second read flip-flop is a D flip-flop and the third read flip-flop is a D flip-flop. In a preferred embodiment, the first write logic gating means includes a logic NOT gate which has an input connected to the output of the third write flip flop. The first write logic gating means also includes a first logic XOR means having a first input connected to an output of the logic NOT gate, a second input connected to the write pointer, and an output which generates the not full output. The first read logic gating means includes a first logic XOR gate having a first input connected to the output of the third read flip-flop, a second input connected to the read pointer, and an output which generates the not empty output. The second write logic gating means includes a first logic AND gate having a first input connected to the write input, a second input connected to the not full output, and an output connected to the input of the first write flip-flop. The second read logic gating means includes a second logic AND gate having a first input connected to the read input, a second input connected to the not empty output, and an output connected to the input of the first read flip-flop.

In a third preferred embodiment of the present invention, the one stage first-in-first-out synchronizer includes a first write flip-flop, a first read flip-flop, a second write flip-flop, a second read flip-flop, a third write flip-flop, a third read flip-flop, a write clock input, a write input, a not fill output, first write logic gating means, second write logic gating means, a read clock input, a read input, a not empty output, first read logic gating means, and second read logic gating means.

The first write flip-flop generates a write pointer. The first read flip-flop generates a read pointer. The second write flip-flop receives as input the read pointer. The third write flip-flop has an output connected to the not full output. The second read flip-flop receives as input the write pointer. The third read flip-flop has an output connected to the not empty output. The write clock input provides a write clock signal to the first write flip-flop, the second write flip-flop and the third write flip-flop. The first write logic gating means generates an input to the third output from an input to the first write flip-flop and an output of the second write flip-flop. The second write logic gating means generates an input to the first write flip-flop from the write input the not full output and the write pointer. The read clock input provides a read clock signal to the first read flip-flop, the second read flip-flop and the third read flip-flop. The first read logic gating means generates an input to the third flip-flop from an input of the first flip-flop and an output of the second read flip-flop. The second read logic gating means generates an input to the first read flip-flop from the read input, the not empty output and the read pointer.

For example, the first write flip-flop is a toggle (T) flip-flop, the second write flip-flop is a delay (D) flip-flop, the third write flip-flop is a delay (D) flip-flop, the first read flip-flop is a T flip-flop, the second read flip-flop is a D flip-flop and the third read flip-flop is a D flip-flop. In a preferred embodiment, the first write logic gating means includes a logic NOT gate which has an input connected to the output of the second write flip flop. The first write logic gating means also includes a first logic XOR means which has a first input connected to an output of the logic NOT gate, a second input connected to the input of the first write flip-flop, and an output connected to the input of the third write flip-flop. The first read logic gating means includes a second logic XOR gate which has a first input connected to the output of the third read flip-flop, a second input connected to the input of the first read flip-flop, and an output connected to the input of the third read flip-flop. The second write logic gating means includes a first logic AND gate which has a first input connected to the write input and a second input connected to the not full output. The second write logic gating means also includes a third logic XOR gate which has a first input connected to an output of the first logic AND gate, a second input connected to the write pointer and an output connected to the input of the first write flip-flop; and. The second read logic gating means includes a second logic AND gate which has a first input connected to the read input and a second input connected to the not empty output. The second read logic gating means also includes a fourth logic XOR gate which has a first input connected to an output of the second logic AND gate, a second input connected to the read pointer and an output connected to the input of the first read flip-flop.

The present invention allows for a much simpler protocol than the conventional means of connecting two state machines. Further, first-in-first out synchronizer of the present invention requires simpler and much less logic to implement that the first-in-first out synchronizer described in U.S. Pat. No. 4,873,703, issued U.S. Pat. No. 4,873,703 to Douglas Crandall et al., for SYNCHRONIZING SYSTEM.

The complex part of the producer and consumer state machines is replaced by a standard functional block that is well tested. The producer and consumer state machines now interface with their respective ends of the first-in-first out synchronizer using a fully-synchronous and trivial protocol. When the producer and the producer end of the first-in-first out synchronizer are both ready the producer writes data out. When the consumer and the consumer end of the first-in-first out synchronizer are ready the consumer writes data in. The producer and the consumer no longer need to deal with the fact that their clocks are different since they now talk to a circuit that is operating with the same clock. It is entirely up to the first-in-first out synchronizer to deal with the different clock domains.

Another advantage of the present invention is that the two signals that cross the clock domain each have only one transitions per handshake cycle. This permits faster operation of the interface. By contrast the conventional circuits use two-wire fully-interlocked handshake, where each transition on one signal is acknowledged by a transition on the other signal. This requires two transitions per cycle.

DESCRIPTION OF THE PREFERRED EMBODIMENT

Figure 1:
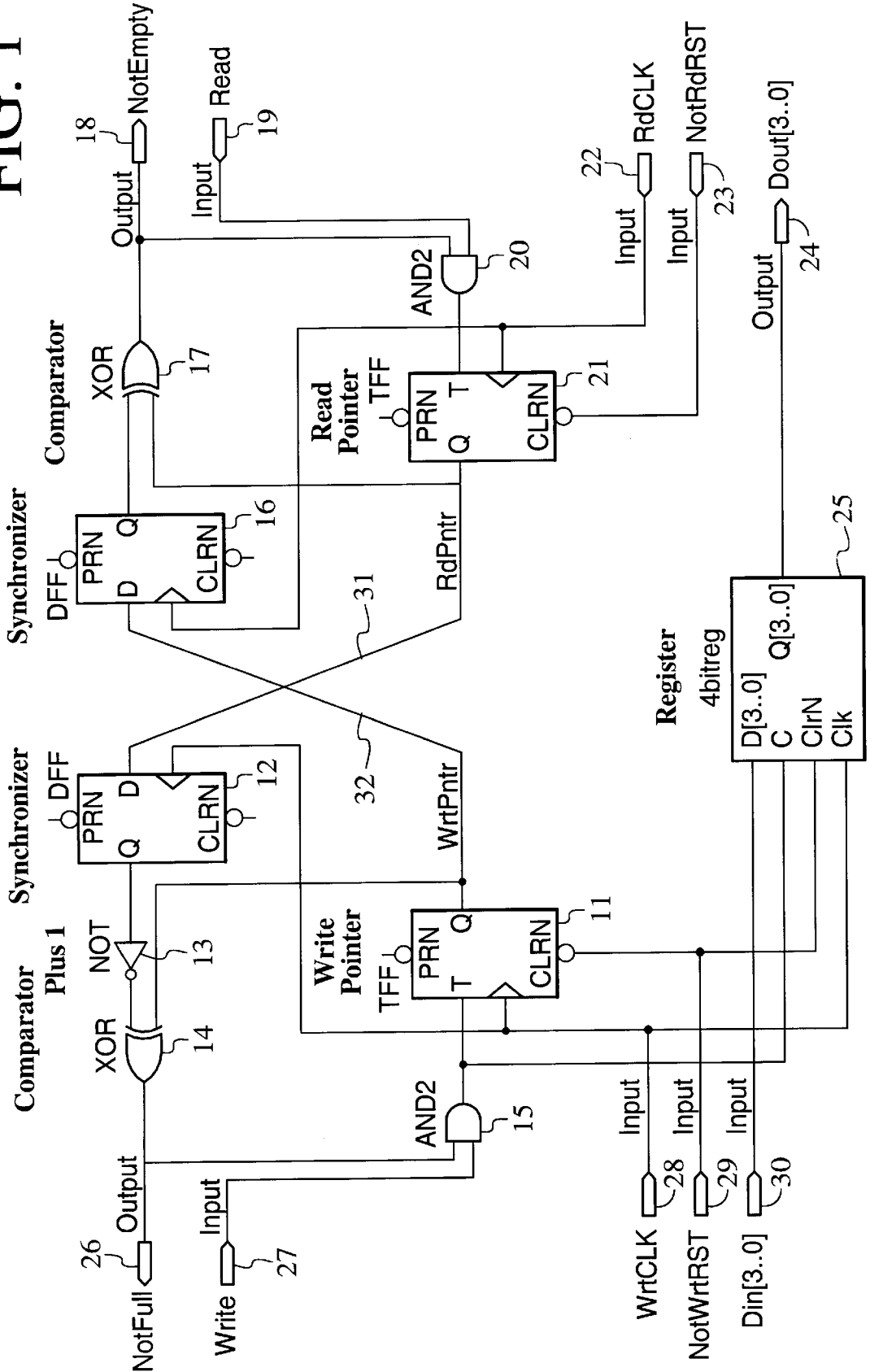
FIG. 1 is a circuit diagram of a single stage FIFO synchronizer in accordance with a preferred embodiment of the present invention.

FIG. 1 is a circuit diagram of a single stage FIFO synchronizer in accordance with a preferred embodiment of the present invention. On the producer side, the single stage FIFO synchronizer includes a write input 27, a write clock (WrtCLK) input 28, a reset (NotWrtRST) input 29 and data (Din[3..0]) input 30. A NotFull output 26 indicates whether the single stage FIFO synchronizer is ready to receive more data from the producer.

On the consumer side, the single stage FIFO synchronizer includes a read input 19, a read clock (RdCLK) input 22, a reset (NotRdRST) input 23 and data (Din[3..0]) output 24. A not empty output 18 indicates whether the single stage FIFO synchronizer is ready to transfer more data to the consumer.

The single stage FIFO synchronizer includes a comparator 14, an inverter 13, a synchronizer flip-flop 12, a synchronizer flip-flop 16, a comparator 17, a logic AND gate 15, a write pointer flip-flop 11, a read pointer flip-flop 21, a logic AND gate 20 and a four bit register 25, connected as shown.

The single stage FIFO synchronizer provides for a simple protocol by which the producer and the consumer interface with their respective ends of the single stage FIFO synchronizer. Specifically, when the producer and its end of the single stage FIFO synchronizer are ready, a data transfer takes place from the producer to the single stage FIFO synchronizer the transfer. When the consumer and its end of the single stage FIFO synchronizer are ready, a transfer takes place from the single stage FIFO synchronizer to the consumer.

When the single stage FIFO synchronizer shown in FIG. 1 is used, the producer and consumer no longer need to deal with the fact that the clock for the consumer and the clock for the producer are different since they now talk to a circuit that is operating with the same clock. It is entirely up to the single stage FIFO synchronizer to deal with the different clock domains.

Another advantage of the present invention is that the two signals (a write pointer 32 and a read pointer 31) that cross the clock domain each have only one transition per handshake cycle.

Figure 2:
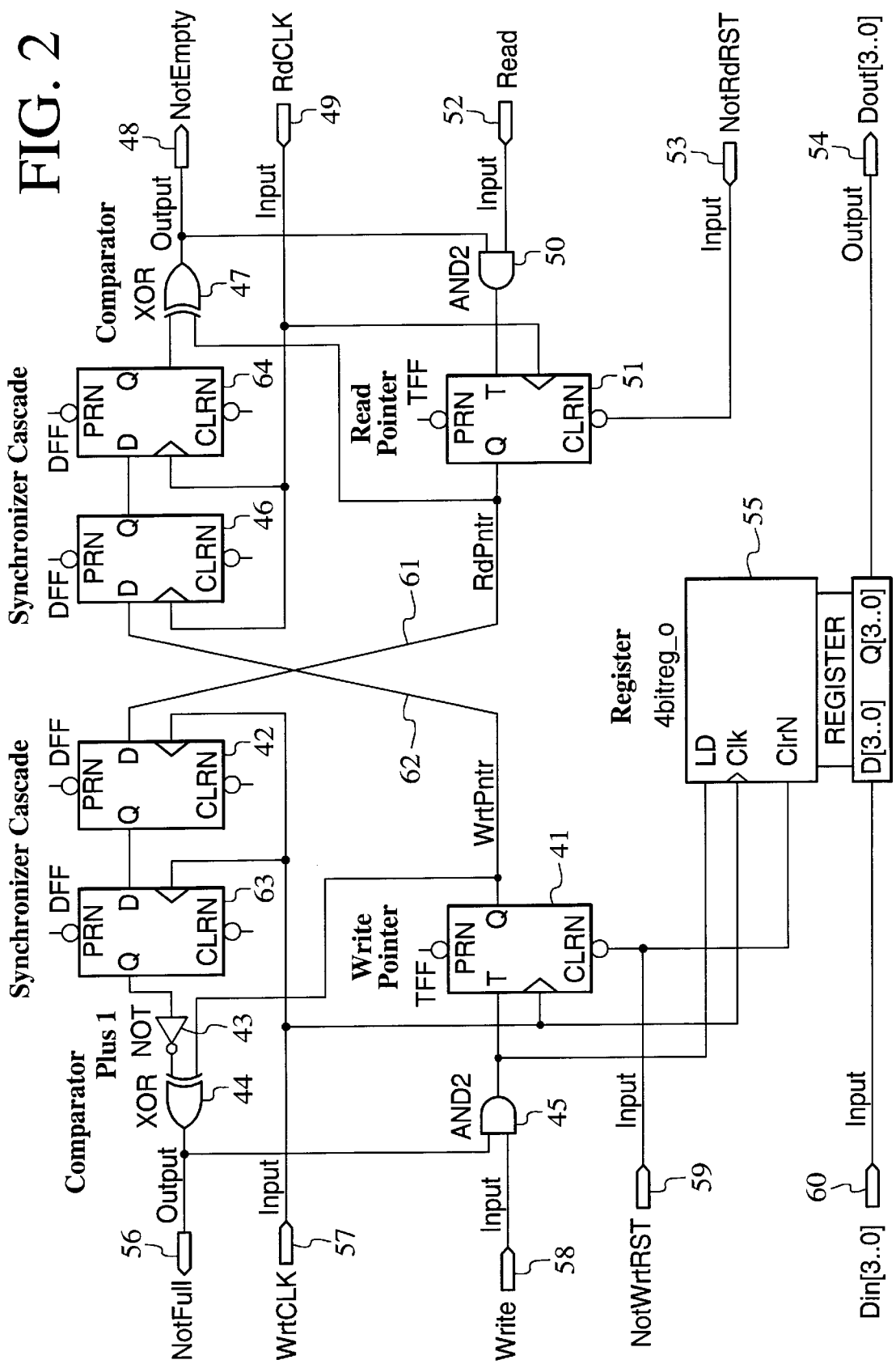
FIG. 2 is a circuit diagram of a single stage FIFO synchronizer with a synchronizer flip-flop cascade on each clock domain, of size two, in accordance with a preferred embodiment of the present invention.

FIG. 2 is a circuit diagram of a single stage FIFO synchronizer with a synchronizer flip-flop cascade, of size two, on each clock domain in accordance with a preferred embodiment of the present invention. The cascade results in lower synchronization failure rate of the single stage FIFO synchronizer. The cacade depth may be extended as necessary to achieve an acceptable failure rate. The protocol still works as described.

On the producer side, the single stage FIFO synchronizer includes a write input 57, a write clock (WrtCLK) input 58, a reset (NotWrtRST) input 59 and data (Din[3..0]) input 60. A NotFull output 56 indicates whether the single stage FIFO synchronizer is ready to receive more data from the producer.

On the consumer side, the single stage FIFO synchronizer includes a read input 52, a read clock input 49, a reset (NotRdRST) input 53 and data (Din[3..0]) output 54. A not empty output 48 indicates whether the single stage FIFO synchronizer is ready to transfer more data to the consumer.

The single stage FIFO synchronizer includes a comparator 44, an inverter 43, a synchronizer flip-flop 42 cascaded with a synchronizer flip-flop 63, a synchronizer flip-flop 46 cascaded with a synchronizer flip-flop 64, a comparator 47, a logic AND gate 45, a write pointer flip-flop 41, a read pointer flip-flop 51, a logic AND gate 50 and a four bit register 55, connected as shown. The two signals (a write pointer 62 and a read pointer 61) that cross the clock domain each have only one transition per handshake cycle.

Figure 3:
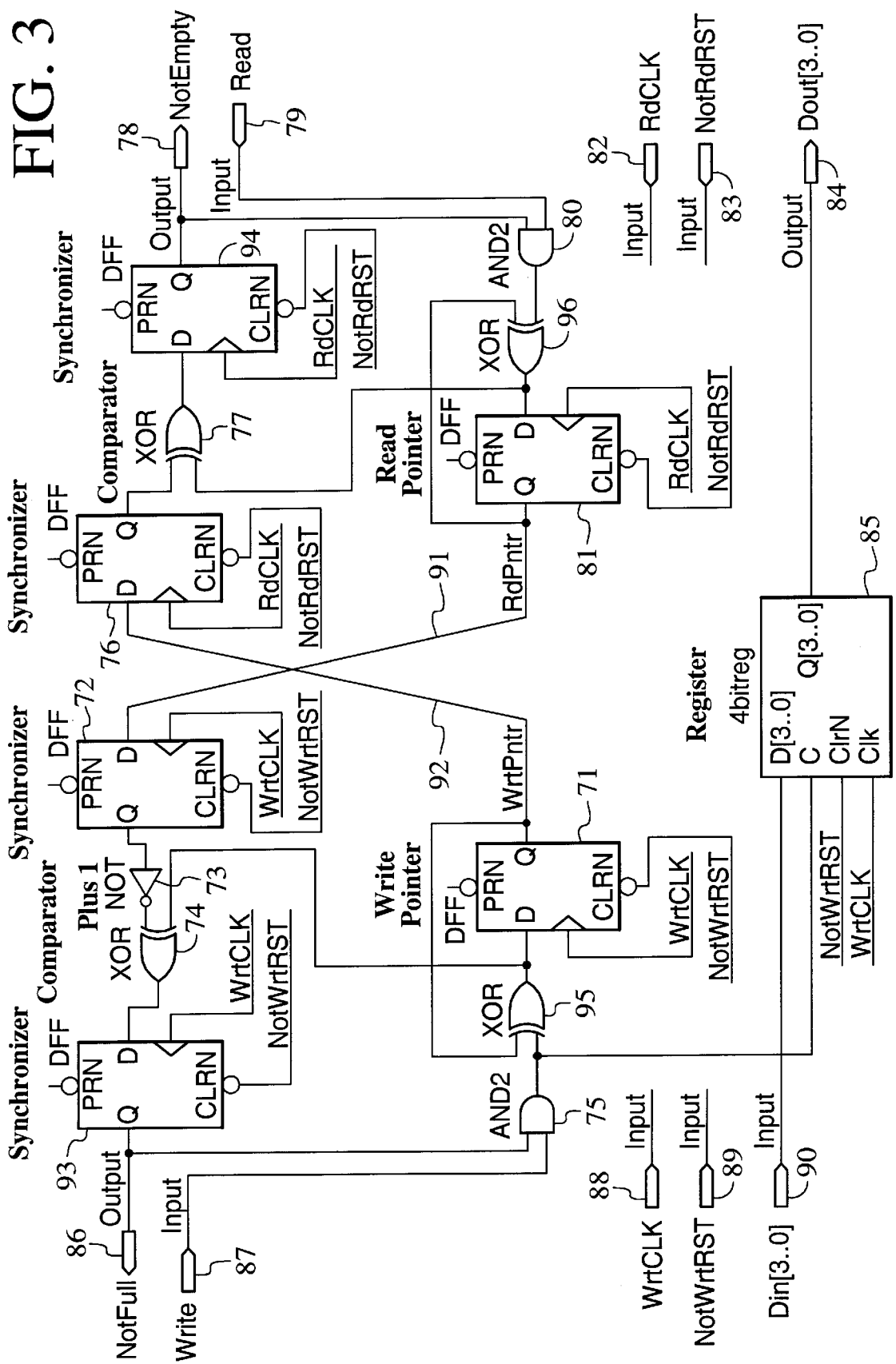
FIG. 3 is a circuit diagram of a single stage FIFO synchronizer with a synchronizer flip-flop cascade on each clock domain, of size two, in accordance with an alternative preferred embodiment of the present invention.

FIG. 3 is a circuit diagram of a single stage FIFO synchronizer with a synchronizer flip-flop cascade, of size two, on each clock domain.

On the producer side, the single stage FIFO synchronizer includes a write input 87, a write clock (WrtCLK) input 88, a reset (NotWrtRST) input 89 and data (Din[3..0]) input 90. A NotFull output 86 indicates whether the single stage FIFO synchronizer is ready to receive more data from the producer.

On the consumer side, the single stage FIFO synchronizer includes a read input 79, a read clock (RdCLK) input 82, a reset (NotRdRST) input 83 and data (Din[3..0]) output 84. A not empty output 78 indicates whether the single stage FIFO synchronizer is ready to transfer more data to the consumer.

The single stage FIFO synchronizer includes a comparator 74, an inverter 73, a synchronizer flip-flop 72, a synchronizer flip-flop 93, a synchronizer flip-flop 76, a synchronizer flip-flop 94, a comparator 77, a logic AND gate 75, a write pointer flip-flop 71, a read pointer flip-flop 81, a logic AND gate 80, a four bit register 85, a logic XOR gate 96 and a logic XOR gate 95 connected as shown. The two signals (a write pointer 92 and a read pointer 91) that cross the clock domain each have only one transition per handshake cycle.

The single stage FIFO synchronizer shown in FIG. 3 varies from the single stage FIFO synchronizer shown in FIG. 2 in that synchronizing flip-flop 93 has been moved after comparator 74 and synchronizing flip-flop 94 has been moved after comparator 77 in order to improve the timing at the external interface of the single stage FIFO synchronizer. That is, not full output 86 comes directly from synchronizing flip-flop 93 and not empty output 78 comes directly from synchronizing flip-flop 94. This provides more setup time to the circuits that look at these status indicators.

As shown in FIG. 3, the next value of the local pointer, instead of the present value, is now used in the comparison of local and remote pointer values. Toggle flip-flop 41 and toggle flip-flop 51, shown in FIG. 2 have been replaced by delay (D) flip-flop 71 and D flip-flop 81, respectively, in order to make the next value of the pointer available.

Figure 4A:
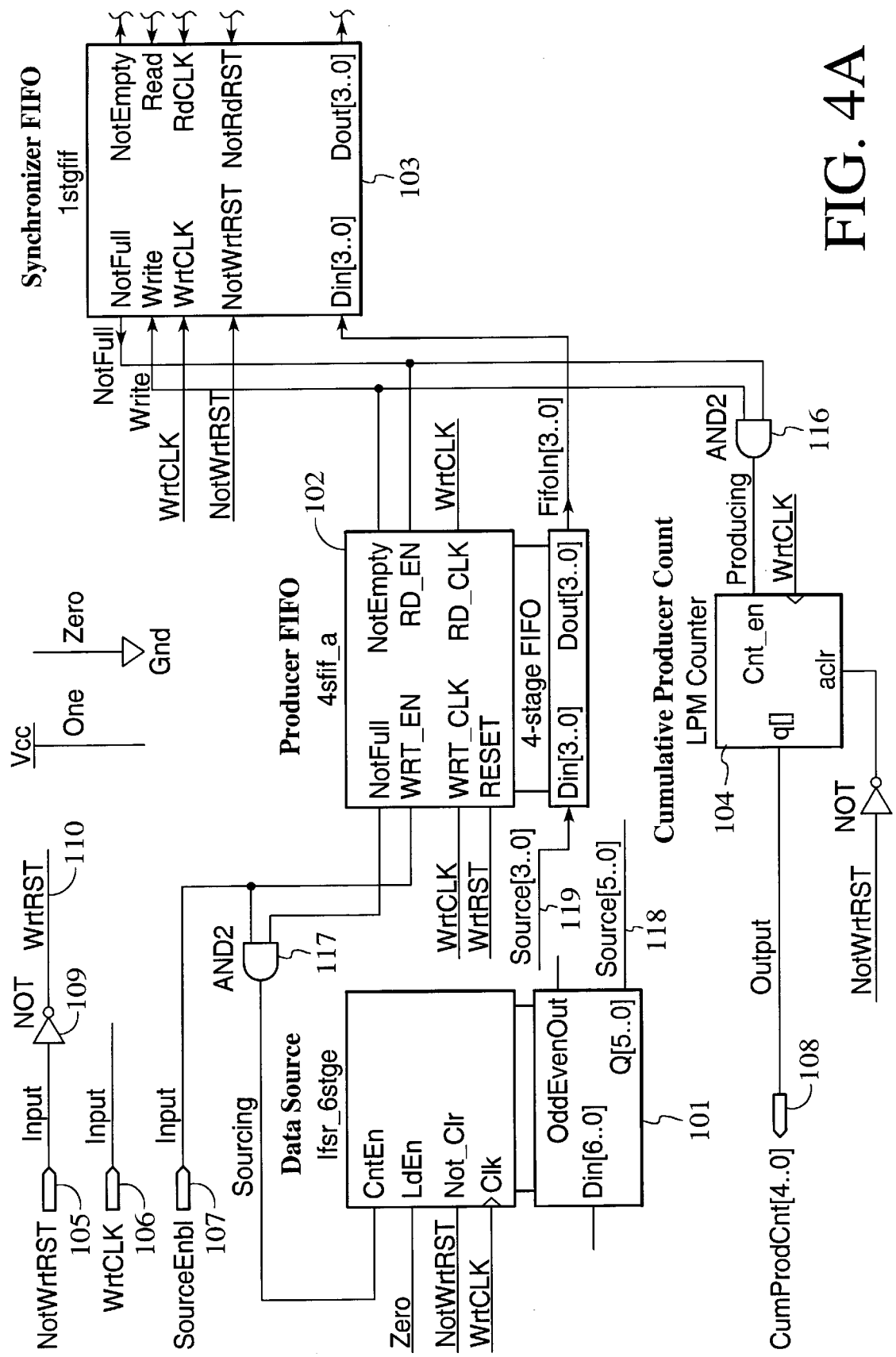
FIGS. 4A–4B is a block diagram of a system which uses a single stage FIFO synchronizer in accordance with a preferred embodiment of the present invention.
Figure 4B:
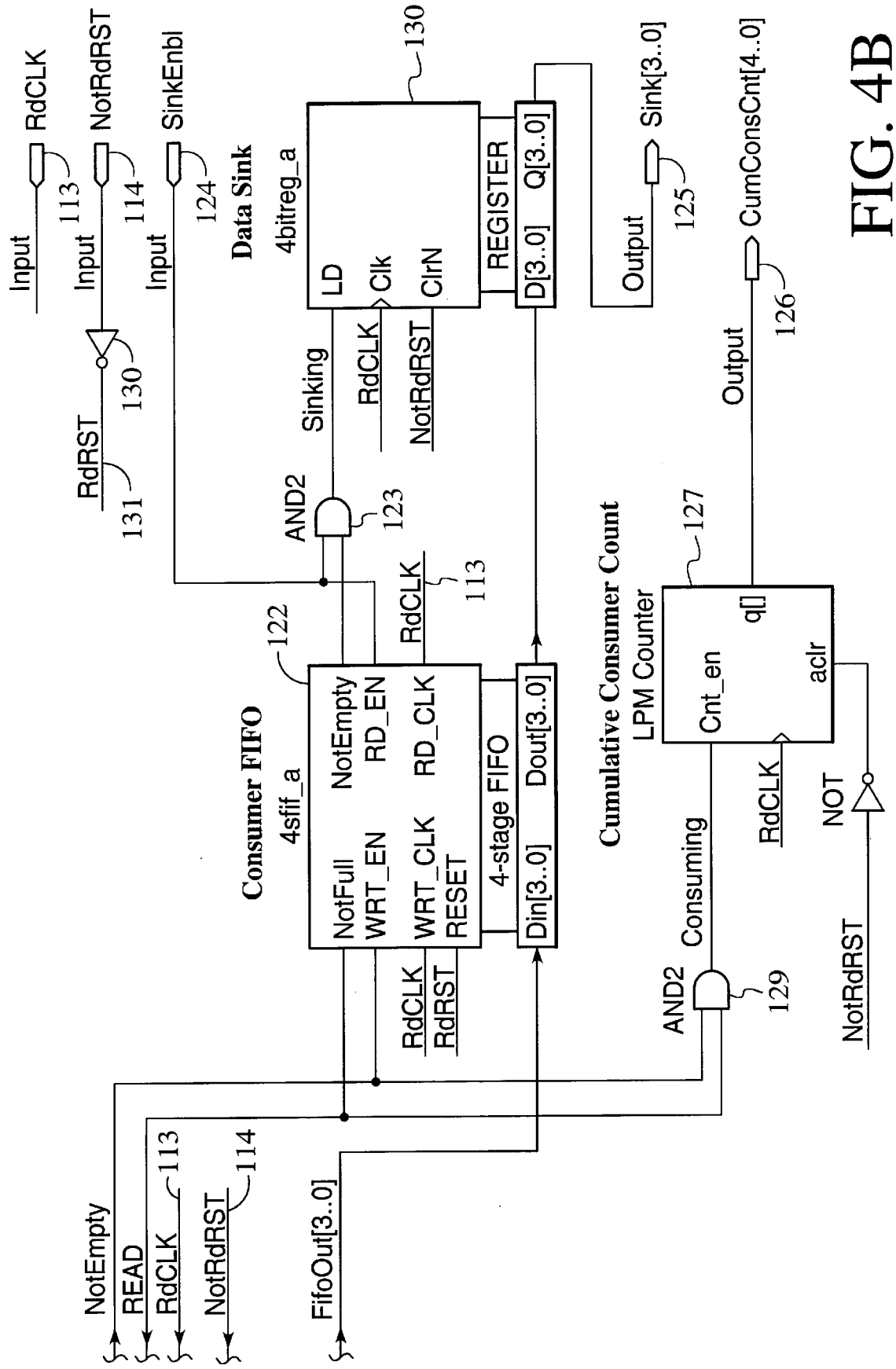

FIG. 4 is a block diagram of a system which uses a single stage FIFO synchronizer 103. A data source 101 is, for example, a counter. For example, data source 101 is implemented using a linear feedback shift register. Data source 101 generates pseudo-random data 118, which provides input 119 to a producer FIFO 102. Producer FIFO 102, on every cycle of write clock (WrtCLK) 106, as long as external signal source enable (SourceEnbl) 107 is true and producer FIFO 102 is not full, feeds single stage FIFO synchronizer 103 whenever both producer FIFO 102 and single stage FIFO synchronizer 103 are ready. Each transfer logged in cumulative producer count 104 and output as cumulative producer count (CumProdCnt) 108.

Single stage FIFO synchronizer 103 feeds a consumer FIFO 122 whenever both single stage FIFO synchronizer 103 and consumer FIFO 122 are ready. Each transfer between single stage FIFO synchronizer 103 and consumer FIFO 122 is logged in a cumulative consumer counter 127 and output as cumulative consumer count (CumConsCnt) 126. A data sink 130 reads data from consumer FIFO 122 whenever consumer FIFO 122 is not empty and external signal sink enable (SinkEnbl) 124 is true. The current value is placed on a sink output 125. A reset (NotWrtRST) input 105 and logic NOT gate 109 are used to produce a reset (WrtRST) signal 110. A reset (NotRdRST) input 114 and logic NOT gate 130 are used to produce a reset (RdRST) signal 131. A read clock (RdCLK) 113 is used for consumer timing. Also shown in FIG. 4 are a logic AND gate, 129, a logic AND gate 123, a logic AND gate 116 and a logic AND gate 117, connected as shown.

Figure 5:
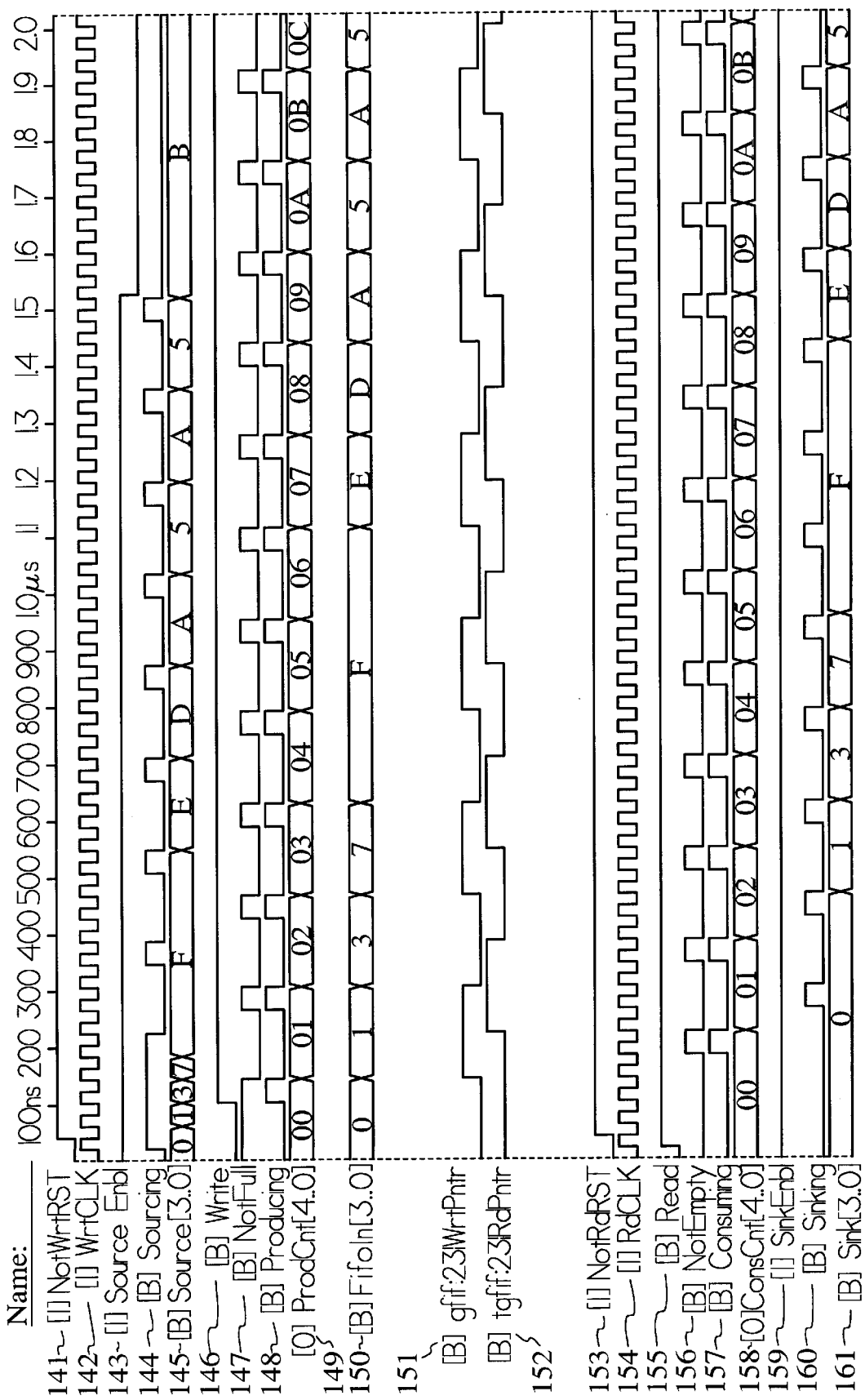
FIG. 5 shows a timing diagram, for the system shown in FIG. 4, in which both producer and consumer clocks are the same frequency and phase and both producer and consumer are always ready, on every clock, to produce or consume.

FIG. 5 shows a timing diagram of a simulation of FIG. 4 in which both write clock 106 and read clock 113 operate at the same frequency and the same phase. Additionally, data source 101 is always ready, on every cycle of write clock 106 to produce, and data sink 130 is always ready, on every cycle of read clock 113, to consume.

Signal 141 represents reset (NotWrtRST) input 105 shown in FIG. 4. Signal 142 represents write clock 106 shown in FIG. 4. Signal 143 represents external signal source enable (SourceEnbl) 107 shown in FIG. 4. Signal 144 represents the output (Sourcing) of logic AND gate 117 shown in FIG. 4. Signal 145 represents input 119 to a producer FIFO 102 shown in FIG. 4. Signal 146 represents a write (Write) input to synchronizer FIFO 103, shown in FIG. 4. Signal 147 represents a not full reset (NotFull) output of synchronizer FIFO 103 shown in FIG. 4. Signal 148 represents the output (Producing) of logic AND gate 116 shown in FIG. 4. Signal 149 represents cumulative producer count (CumProdCnt) 108 shown in FIG. 4. Signal 150 represents data (Din[3..0]) input to synchronizer FIFO 103 shown in FIG. 4.

Signal 151 represents a writer pointer within synchronizer 103 (see for example writer pointer 92 shown in FIG. 3). Signal 152 represents a read pointer within synchronizer 103 (see for example read pointer 91 shown in FIG. 3).

Signal 153 represents reset (NotRdRST) input 114 shown in FIG. 4. Signal 154 represents read clock 113 shown in FIG. 4. Signal 155 represents a read input to synchronizer FIFO 103 shown in FIG. 4. Signal 156 represents a not empty reset (NotEMPTY) output of synchronizer FIFO 103 shown in FIG. 4. Signal 157 represents the output (Consuming) of logic AND gate 129 shown in FIG. 4. Signal 158 represents cumulative consumer count (CumConsCnt) 126 shown in FIG. 4. Signal 159 represents external signal sink enable (SinkEnbl) 124 shown in FIG. 4. Signal 160 represents the output (Sinking) of logic AND gate 123 shown in FIG. 4. Signal 161 represents the sink output 125 shown in FIG. 4.

The two control signals that cross clock domains are the writer pointer within synchronizer 103 (see for example writer pointer 92 shown in FIG. 3) and the read pointer within synchronizer 103 (see for example read pointer 91 shown in FIG. 3). Each of these signals make one transition per handshake cycle. In FIG. 5, one handshake cycle is shown to take 4 producer clocks. It is not possible to transfer once per producer clock even though the producer and consumer are always ready and clocked at the same frequency because one FIFO stage is not sufficient to compensate for the latency in the handshake path. The FIFO would need to have 4 stages in order to allow a transfer on every clock, i.e. to decouple the data transfer rate from the handshake rate.

A single-stage FIFO synchronizer, such as those described above, may be used not only to handshake signals, between a producer and a consumer, that go through the single-stage FIFO synchronizer's internal data stage, but also can be used to handshake signals for data that completely bypass the single-stage FIFO synchronizer. When used to handshake signals for data that completely bypass the single-stage FIFO synchronizer, the number of data bits that a single stage FIFO synchronizer may handle for each transfer is unbounded.

When the data being handshaked bypasses the single-stage FIFO synchronizer, then the producer needs to behave a little different than when the data goes through the single-stage FIFO synchronizer. Additionally, the data register within the single-stage FIFO synchronizer can be removed without affecting the operation of the FIFO.

Implementing a system in which data being handshaked bypasses the single-stage FIFO synchronizer may be done in various ways. For example, in one embodiment, data bypasses the single-stage FIFO synchronizer but is buffered externally. Essentially, when data is buffered externally, the producer behaves the same as if data goes through the single-stage FIFO synchronizer and is buffered internally in the single register stage. External buffering is done with an edge triggered register which is controlled or treated exactly the same way as the internal register. The implementation of this is identical to the embodiment shown in FIG. 4, except that the equivalent of register 85 (shown in FIG. 3) is moved outside signal-stage FIFO synchronizer 103.

In an alternative embodiment, data bypasses the single-stage FIFO synchronizer and is not buffered.

In the case data bypasses the single-stage FIFO synchronizer and is not buffered externally, the producer must wait until an item of data is consumed—that is until the single-stage FIFO synchronizer becomes empty-before the producer can log the production and is thus free to change the data.

Figure 6A:
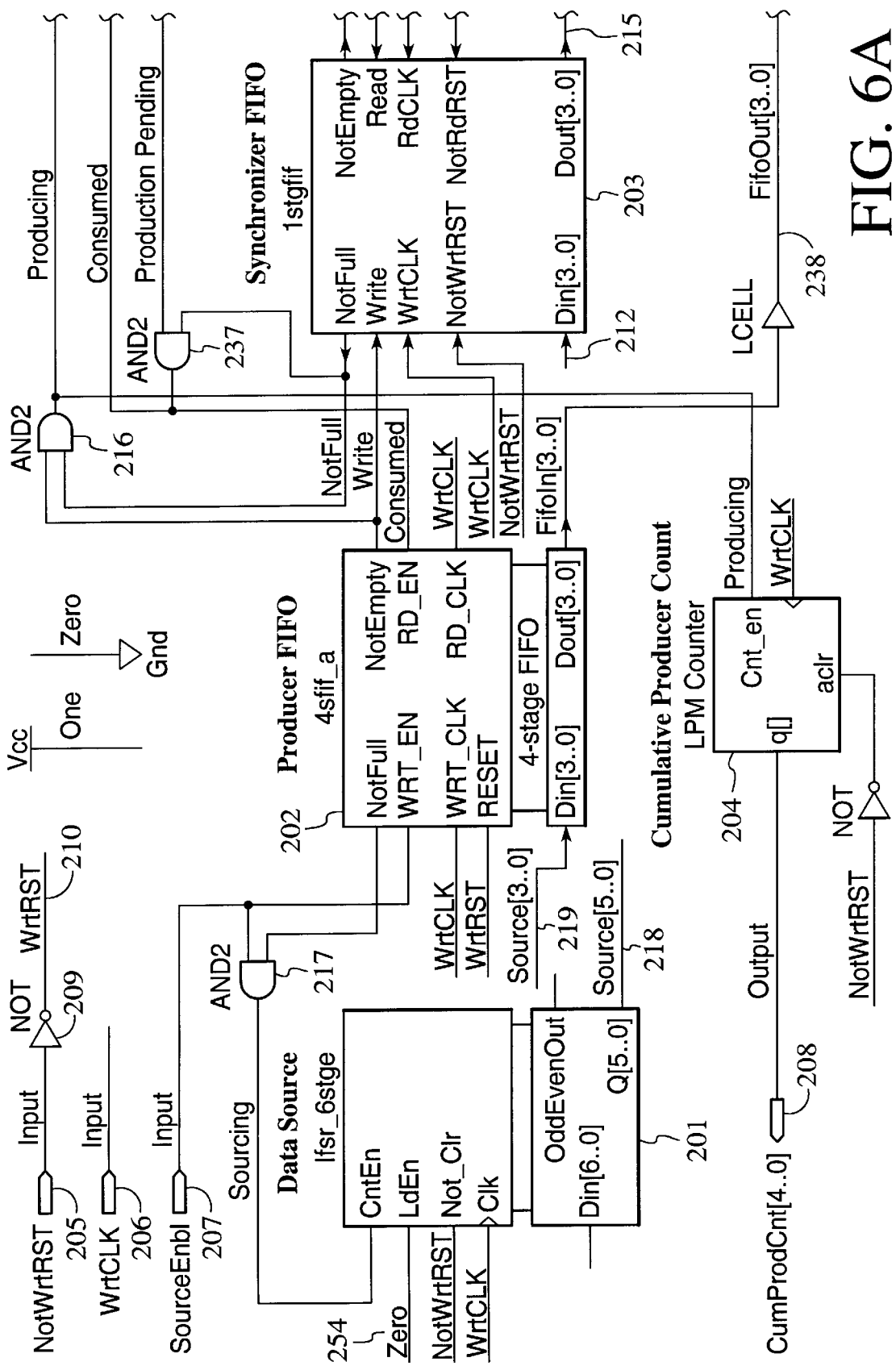
FIGS. 6A–6B is a block diagram of a system in which a single stage FIFO synchronizer is used and in which data bypasses the single stage FIFO synchronizer and is not latched in accordance with a preferred embodiment of the present invention.
Figure 6B:
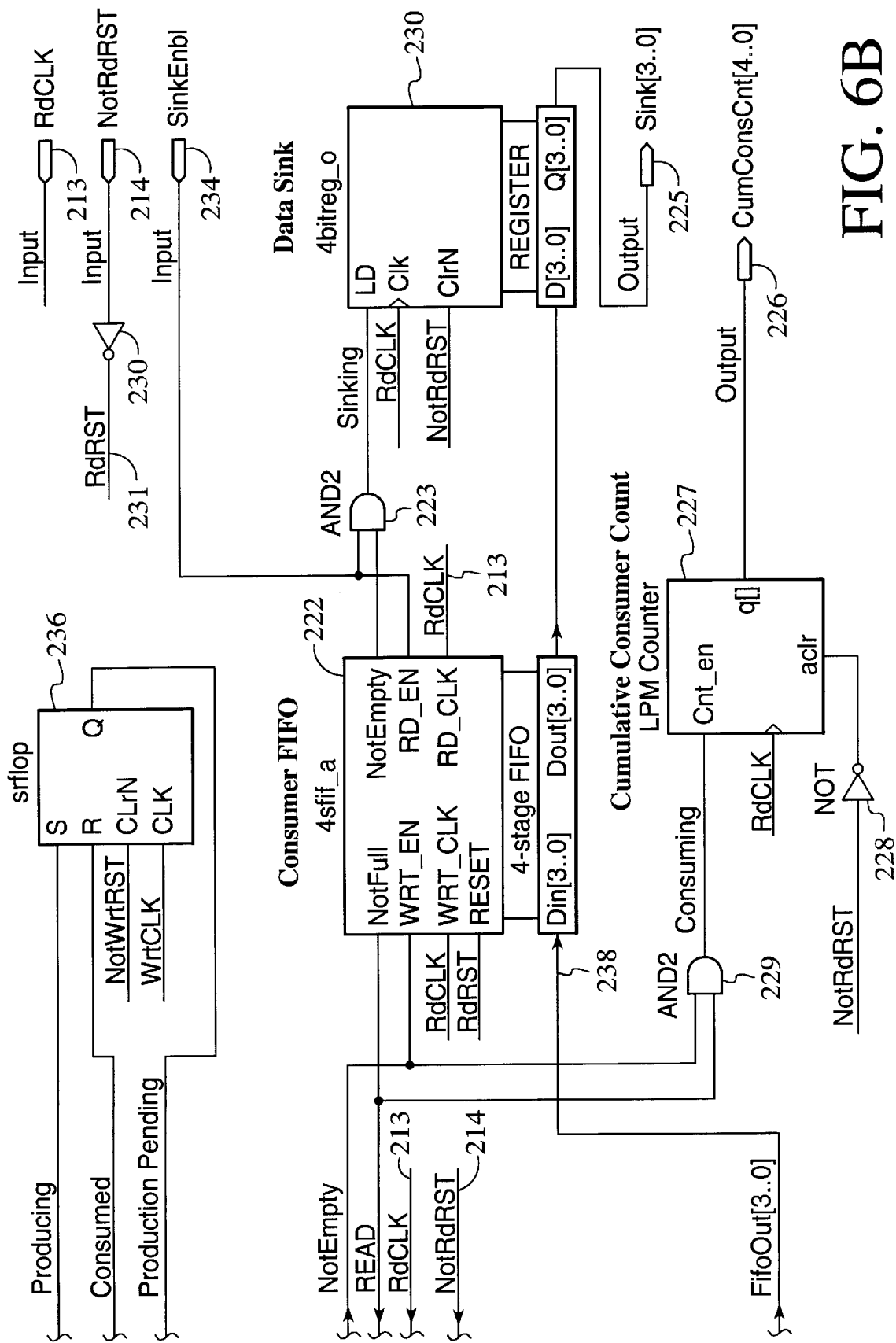

FIG. 6 is a block diagram of a system in which a single stage FIFO synchronizer 203 is used. Data bypasses single stage FIFO synchronizer 203 and is not latched.

In FIG. 6, a data source 201 is, for example, a counter. For example, data source 201 is implemented using a linear feedback shift register. Data source 201 generates pseudo-random data 218, which provides input 219 to a producer FIFO 202. Producer FIFO 202, on every cycle of write clock (WrtCLK) 206, as long as external signal source enable (SourceEnbl) 207 is true and producer FIFO 202 is not full, feeds data through to consumer FIFO 222 whenever both producer FIFO 202 and single stage FIFO synchronizer 203 are ready. Consuming the data from producer FIFO 202 is delayed until single stage FIFO synchronizer 203 signals empty. Each transfer is logged in cumulative producer count 204 and output as cumulative producer count (CumProdCnt) 208.

Each transfer between producer FIFO 202 and consumer FIFO 222 is logged in a cumulative consumer count 227 and output as cumulative consumer count (CumConsCnt) 226. A data sink 230 reads data from consumer FIFO 222 whenever consumer FIFO 222 is not empty and external signal sink enable (SinkEnbl) 224 is true. The current value is placed on a sink output 225. A reset (NotWrtRST) input 205 and logic NOT gate 209 are used to produce a reset (WrtRST) signal 210. A reset (NotRdRST) input 214 and logic NOT gate 230 are used to produce a reset (RdRST) signal 231. A read clock (RdCLK) 213 is used for consumer timing. Also shown in FIG. 6 are a logic AND gate, 229, a logic AND gate 223, a logic AND gate 216 and a logic AND gate 217, connected as shown. Data in 212 and data out 215 of single stage FIFO synchronizer 203 are not used. Instead, as illustrated by data lines 238, data bypasses single stage FIFO synchronizer 203.

As is seen from FIG. 6, when data bypasses single-stage FIFO synchronizer 203 and is not buffered externally, data is written from producer FIFO 202 when both producer FIFO 202 and synchronizer FIFO 203 are ready; however, the same data is not read from the producer FIFO 202 until FIFO synchronizer 203 has been emptied.

Because FIFO synchronizer 203 is a single stage FIFO, producer FIFO 202 can know when consumer FIFO 222 empties. This is because a single-stage FIFO can only be empty or full Producer FIFO 202 can thus tell that synchronizer FIFO 203 is empty by looking at the Not Full output of synchronizer FIFO 203. The value of the NotFull output is the complement, after some delay, of the NotEMPTY output of synchronizer FIFO 203.

When producer FIFO 202, after producing, sees the value of the NotFull output of single stage synchronizer FIFO 203 go TRUE, then producer FIFO 202 knows the data has been consumed. Producer FIFO 203 interfaces with a production pending flip-flop 236 which producer FIFO 203 sets upon every production. Production pending flip-flop 236 is cleared whenever its present value is TRUE and the Not Full becomes TRUE. Simultaneously, producer FIFO 202 logs the production and can change the signals being handshaked.

Figure 7:
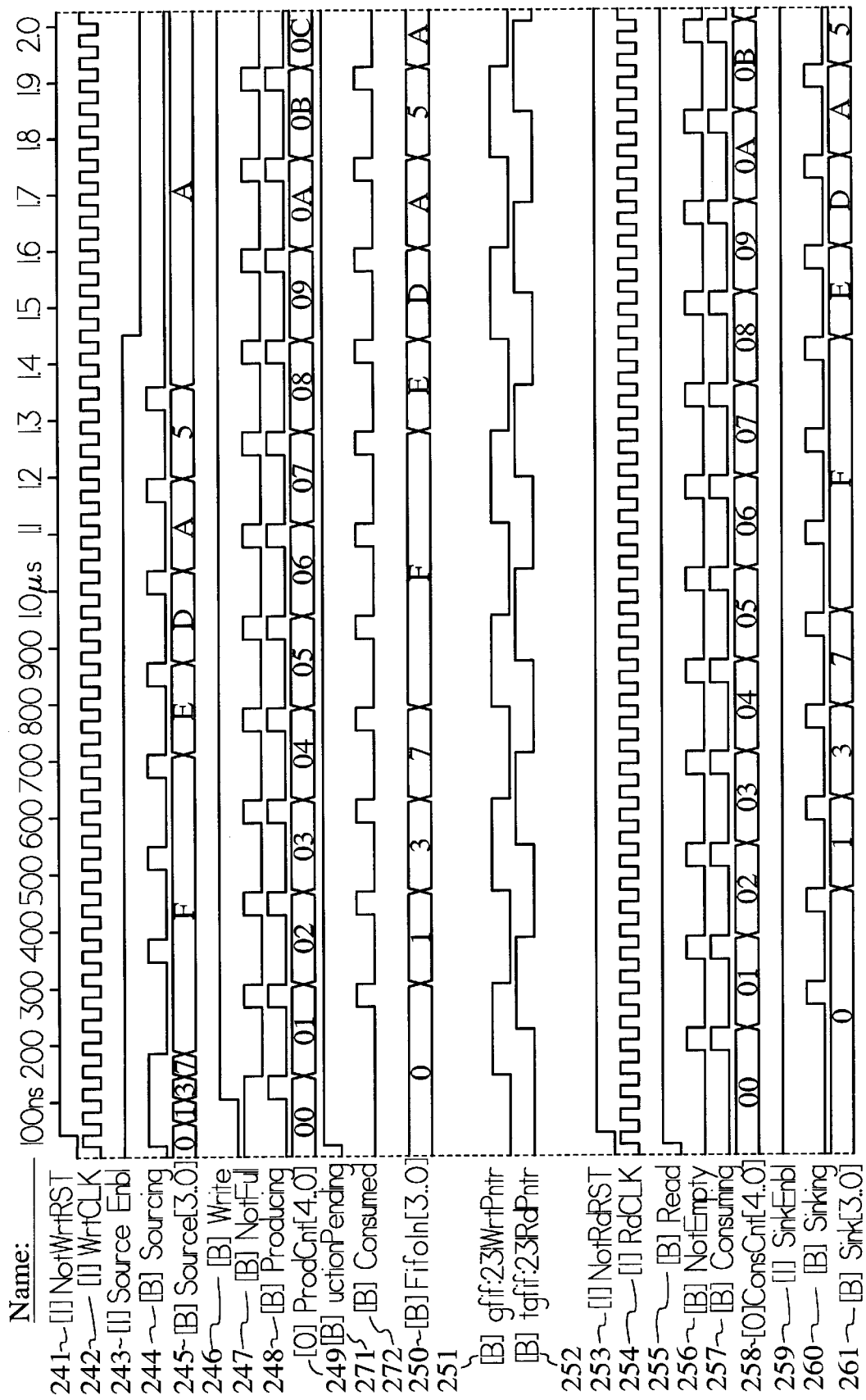
FIG. 7 shows a timing diagram of a simulation, for the system shown in FIG. 6, in which both producer and consumer clocks are the same frequency and phase, and both producer and consumer are always ready to produce or consume.

FIG. 7 shows a timing diagram of a simulation of the system shown in FIG. 6 in which both write clock (producer clock) 206 and read clock (consumer clock) 213 have the same frequency and have the same phase. Additionally, both the producer and the consumer are always ready to produce or consume.

Signal 241 represents reset (NotWrtRST) input 205 shown in FIG. 6. Signal 242 represents write clock 206 shown in FIG. 6. Signal 243 represents external signal source enable (SourceEnbl) 207 shown in FIG. 6. Signal 244 represents the output (Sourcing) of logic AND gate 217 shown in FIG. 6. Signal 245 represents input 219 to a producer FIFO 202 shown in FIG. 6. Signal 246 represents a write (Write) input to synchronizer FIFO 203, shown in FIG. 6. Signal 247 represents a not full reset (NotFull) output of synchronizer FIFO 203 shown in FIG. 6. Signal 248 represents the output (Producing) of logic AND gate 216 shown in FIG. 6. Signal 249 represents cumulative producer count (CumProdCnt) 208 shown in FIG. 6.

Signal 271 represents the output (production pending) of flip-flop 236 shown in FIG. 6. Signal 272 represents the consumed (Rd_En) output of producer FIFO 202. Signal 250 represents data (FiFoOut[3..0]) on data lines 238 shown in FIG. 6.

Signal 251 represents a writer pointer within synchronizer 203 (see for example writer pointer 92 shown in FIG. 3). Signal 252 represents a read pointer within synchronizer 203 (see for example read pointer 91 shown in FIG. 3).

Signal 253 represents reset (NotRdRST) input 214 shown in FIG. 6. Signal 254 represents read clock 213 shown in FIG. 6. Signal 255 represents a read input to synchronizer FIFO 203 shown in FIG. 6. Signal 256 represents a not empty reset (NotEMPTY) output of synchronizer FIFO 203 shown in FIG. 6. Signal 257 represents the output (Consuming) of logic AND gate 229 shown in FIG. 6. Signal 258 represents cumulative consumer count (CumConsCnt) 226 shown in FIG. 6. Signal 259 represents external signal sink enable (SinkEnbl) 224 shown in FIG. 6. Signal 260 represents the output (Sinking) of logic AND gate 223 shown in FIG. 6. Signal 261 represents the sink output 225 shown in FIG. 6.

Figure 8:
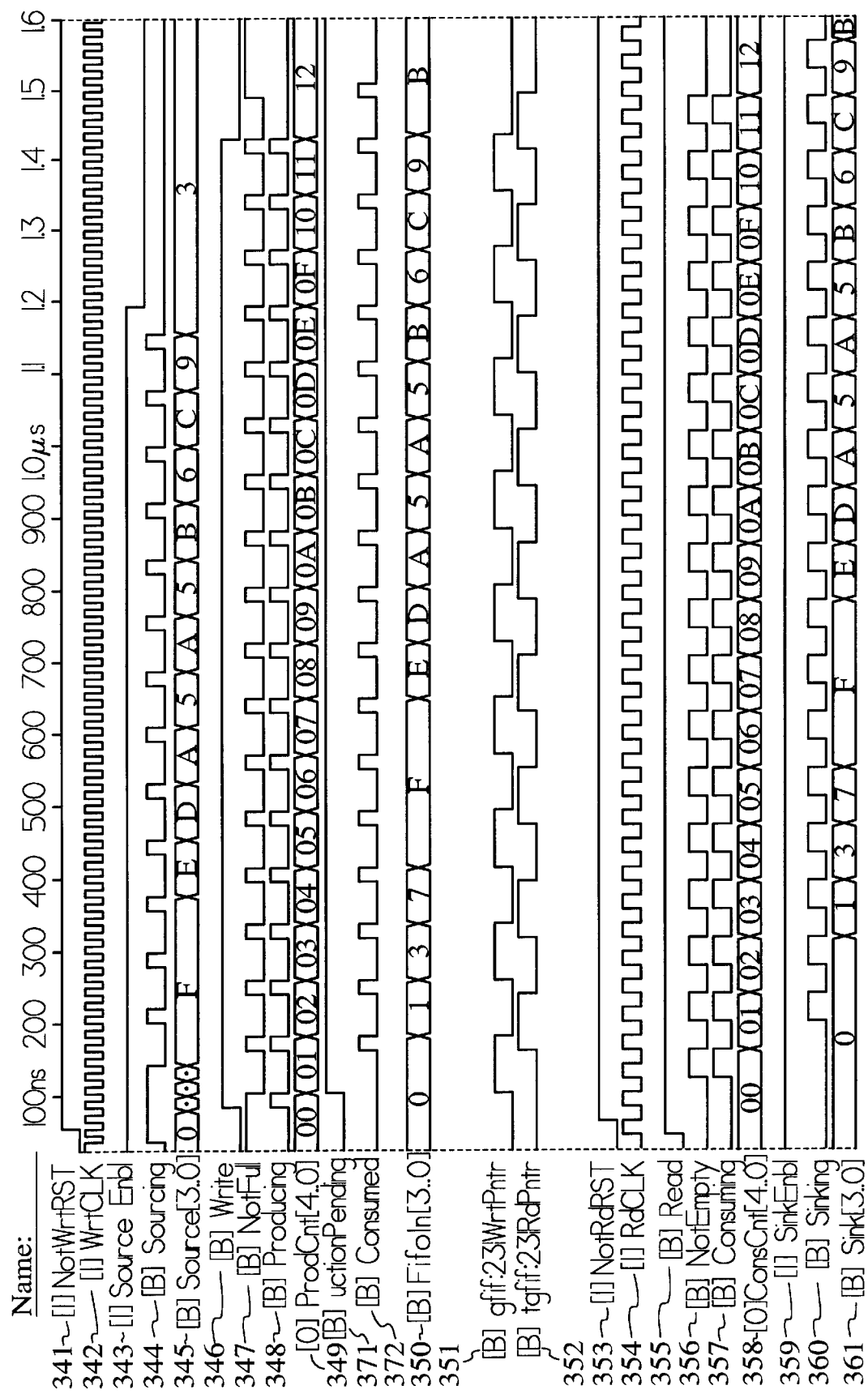
FIG. 8 shows a timing diagram of a simulation, for the system shown in FIG. 6, in which the producer is faster than the consumer.

FIG. 8 shows a timing diagram of a simulation of the system of FIG. 6 in which the producer is faster than the consumer. The producer produces continuously, on every clock, for a while and then stops. The consumer is always ready. The producer clock has a period of 15 nanoseconds (nS). The consumer clock has a period of 40 nS. The first few values of Source[3..0] are not visible due to insufficient resolution. The consumer has unnecessary hold-off, i.e., the consumer is pacing the handshake but only consumes once every two clocks even though it is always ready. This is once again due to insufficient pipelining.

In FIG. 8, signal 341 represents reset (NotWrtRST) input 205 shown in FIG. 6. Signal 342 represents write clock 206 shown in FIG. 6. Signal 343 represents external signal source enable (SourceEnbl) 207 shown in FIG. 6. Signal 344 represents the output (Sourcing) of logic AND gate 217 shown in FIG. 6. Signal 345 represents input 219 to a producer FIFO 202 shown in FIG. 6. Signal 346 represents a write (Write) input to synchronizer FIFO 203, shown in FIG. 6. Signal 347 represents a not full reset (NotFull) output of synchronizer FIFO 203 shown in FIG. 6. Signal 348 represents the output (Producing) of logic AND gate 216 shown in FIG. 6. Signal 349 represents cumulative producer count (CumProdCnt) 208 shown in FIG. 6.

Signal 371 represents the output (production pending) of flip-flop 236 shown in FIG. 6. Signal 372 represents the consumed (Rd_En) output of producer FIFO 202. Signal 350 represents data (FiFoOut[3..0]) on data lines 238 shown in FIG. 6.

Signal 351 represents a writer pointer within synchronizer 203 (see for example writer pointer 92 shown in FIG. 3). Signal 352 represents a read pointer within synchronizer 203 (see for example read pointer 91 shown in FIG. 3).

Signal 353 represents reset (NotRdRST) input 214 shown in FIG. 6. Signal 354 represents read clock 213 shown in FIG. 6. Signal 355 represents a read input to synchronizer FIFO 203 shown in FIG. 6. Signal 356 represents a not empty reset (NotEMPTY) output of synchronizer FIFO 203 shown in FIG. 6. Signal 357 represents the output (Consuming) of logic AND gate 229 shown in FIG. 6. Signal 358 represents cumulative consumer count (CumConsCnt) 226 shown in FIG. 6. Signal 359 represents external signal sink enable (SinkEnbl) 224 shown in FIG. 6. Signal 360 represents the output (Sinking) of logic AND gate 223 shown in FIG. 6. Signal 361 represents the sink output 225 shown in FIG. 6.

Figure 9:
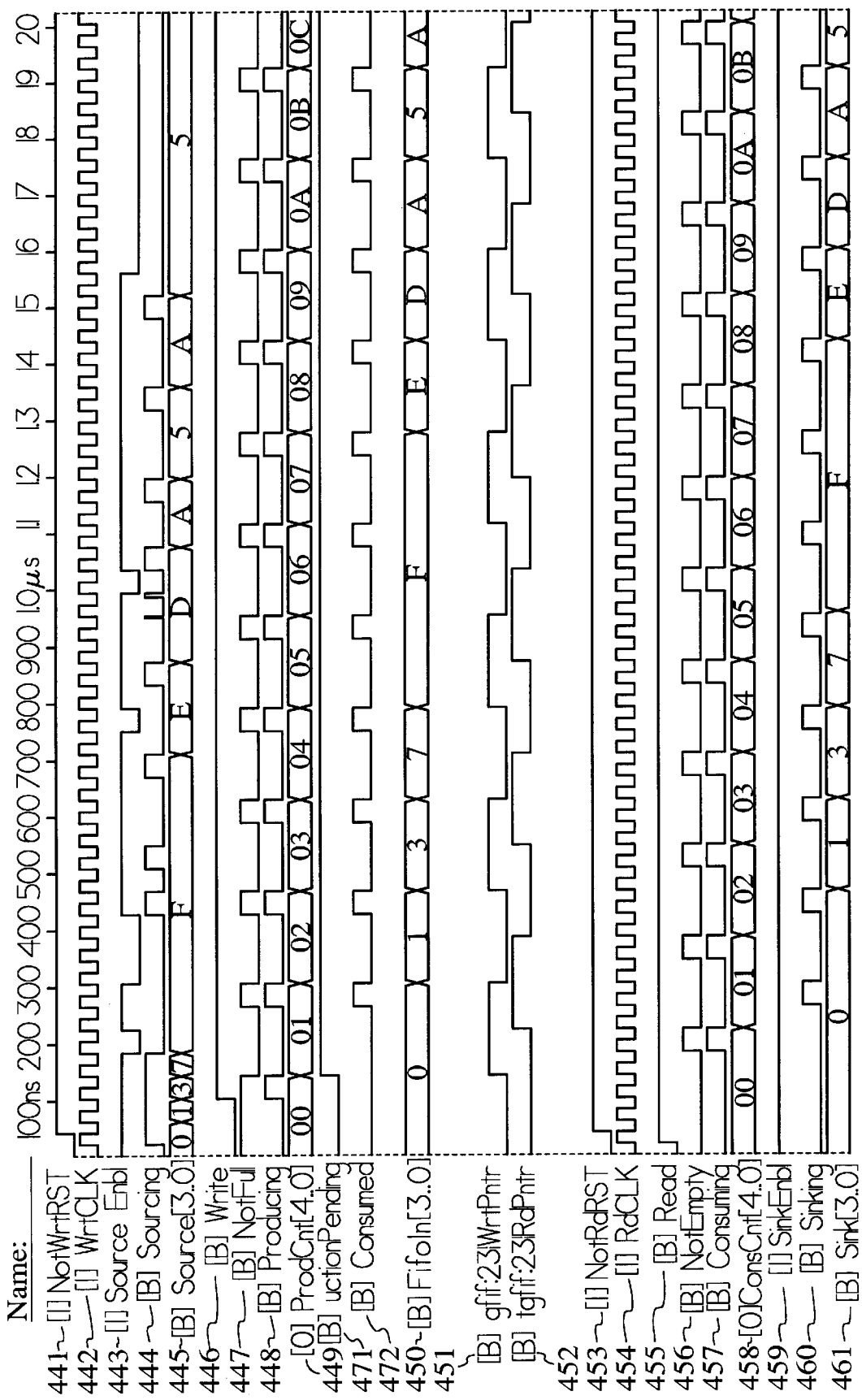
FIG. 9 shows a timing diagram of a simulation, for the system shown in FIG. 6, in which both clocks are the same frequency and phase, and producer produces data intermittently.

FIG. 9 shows a timing diagram of a simulation of the system in FIG. 6 in which both read clock 213 and write clock 206 are the same frequency and phase and the producer produces data intermittently, i.e., the producer is not ready, on every consumer clock period, to produce.

In FIG. 9, signal 441 represents reset (NotWrtRST) input 205 shown in FIG. 6. Signal 442 represents write clock 206 shown in FIG. 6. Signal 443 represents external signal source enable (SourceEnbl) 207 shown in FIG. 6. Signal 444 represents the output (Sourcing) of logic AND gate 217 shown in FIG. 6. Signal 445 represents input 219 to a producer FIFO 202 shown in FIG. 6. Signal 446 represents a write (Write) input to synchronizer FIFO 203, shown in FIG. 6. Signal 447 represents a not full reset (NotFull) output of synchronizer FIFO 203 shown in FIG. 6. Signal 448 represents the output (Producing) of logic AND gate 216 shown in FIG. 6. Signal 449 represents cumulative producer count (CumProdCnt) 208 shown in FIG. 6.

Signal 471 represents the output (production pending) of flip-flop 236 shown in FIG. 6. Signal 472 represents the consumed (Rd_En) output of producer FIFO 202. Signal 450 represents data (FiFoOut[3..0]) on data lines 238 shown in FIG. 6.

Signal 451 represents a writer pointer within synchronizer 203 (see for example writer pointer 92 shown in FIG. 3). Signal 452 represents a read pointer within synchronizer 203 (see for example read pointer 91 shown in FIG. 3).

Signal 453 represents reset (NotRdRST) input 214 shown in FIG. 6. Signal 454 represents read clock 213 shown in FIG. 6. Signal 455 represents a read input to synchronizer FIFO 203 shown in FIG. 6. Signal 456 represents a not empty reset (NotEMPTY) output of synchronizer FIFO 203 shown in FIG. 6. Signal 457 represents the output (Consuming) of logic AND gate 229 shown in FIG. 6. Signal 458 represents cumulative consumer count (CumConsCnt) 226 shown in FIG. 6. Signal 459 represents external signal sink enable (SinkEnbl) 224 shown in FIG. 6. Signal 460 represents the output (Sinking) of logic AND gate 223 shown in FIG. 6. Signal 461 represents the sink output 225 shown in FIG. 6.

The foregoing discussion discloses and describes merely exemplary methods and embodiments of the present invention. As will be understood by those familiar with the art, the invention may be embodied in other specific forms without departing from the spirit or essential characteristics thereof. Accordingly, the disclosure of the present invention is intended to be illustrative, but not limiting, of the scope of the invention, which is set forth in the following claims.

We claim:

1. A one stage first-in-first-out synchronizer, comprising:
   a first write flip-flop which generates a write pointer;
   a first read flip-flop which generates a read pointer;
   a second write flip-flop, which receives as input the read pointer;
   a second read flip-flop, which receives as input the write pointer;
   a write clock input which provides a write clock signal to the first write flip-flop and the second write flip-flop;
   a write input;
   a not full output;
   first write logic gating means, for generating the not full output from the write pointer and an output of the second write flip-flop;
   second write logic gating means for generating an input to the first write flip-flop from the write input and the not full output;
   a read clock input which provides a read clock signal to the first read flip-flop and the second read flip-flop;
   a read input;
   a not empty output;
   first read logic gating means, for generating the not empty output from the read pointer and an output of the second read flip-flop; and,
   second read logic gating means for generating an input to the first read flip-flop from the read input and the not empty output.

2. A one stage first-in-first-out synchronizer as in claim 1 wherein:
   the first write flip-flop is a toggle (T) flip-flop;
   the second write flip-flop is a delay (D) flip-flop;
   the first read flip-flop is a T flip-flop; and
   the second read flip-flop is a D flip-flop.

3. A one stage first-in-first-out synchronizer as in claim 1 wherein the first write logic gating means comprises:
   a logic NOT gate having an input coupled to the output of the second write flip flop; and,
   a first logic XOR means having a first input coupled to an output of the logic NOT gate, a second input coupled to the write pointer, and an output which generates the not full output.

4. A one stage first-in-first-out synchronizer as in claim 1 wherein the first read logic gating means comprises:
   a first logic XOR gate having a first input coupled to the output of the second read flip-flop, a second input coupled to the read pointer, and an output which generates the not empty output.

5. A one stage first-in-first-out synchronizer as in claim 1 wherein:
   the second write logic gating means comprises a first logic AND gate having a first input coupled to the write input, a second input coupled to the not full output, and an output coupled to the input of the first write flip-flop; and,
   the second read logic gating means comprises a second logic AND gate having a first input coupled to the read input, a second input coupled to the not empty output, and an output coupled to the input of the first read flip-flop.

6. A one stage first-in-first-out synchronizer as in claim 1 additionally comprising:
   a register including:
      a data input,
      a data output,
      a clock input, coupled to the write clock input, and
      a load input coupled to the input of the first write flip-flop.

7. A one stage first-in-first-out synchronizer as in claim 1 wherein the second read logic gating means is also for generating a load input to a register, the register being external to the one stage first-in-first-out synchronizer, the register also including, a data input, a data output, a clock input on which is placed the write clock signal.

8. A one stage first-in-first-out synchronizer, comprising:
a first write flip-flop which generates a write pointer;
a first read flip-flop which generates a read pointer;
a second write flip-flop, which receives as input the read pointer;
a third write flip-flop, having an input coupled to an output of the second write flip-flop;
a second read flip-flop, which receives as input the write pointer;
a third read flip-flop, having an input coupled to an output of the second read flip-flop;
a write clock input which provides a write clock signal to the first write flip-flop, the second write flip-flop and the third write flip-flop;
a write input;
a not full output;
first write logic gating means, for generating the not full output from the write pointer and an output of the third write flip-flop;
second write logic gating means for generating an input to the first write flip-flop from the write input and the not full output;
a read clock input which provides a read clock signal to the first read flip-flop, the second read flip-flop and the third read flip-flop;
a read input;
a not empty output;
first read logic gating means, for generating the not empty output from the read pointer and an output of the third read flip-flop; and,
second read logic gating means for generating an input to the first read flip-flop from the read input and the not empty output.

9. A one stage first-in-first-out synchronizer as in claim 8 wherein:
the first write flip-flop is a toggle (T) flip-flop;
the second write flip-flop is a delay (D) flip-flop;
the third write flip-flop is a D flip-flop;
the first read flip-flop is a T flip-flop;
the second read flip-flop is a D flip-flop; and
the third read flip-flop is a D flip-flop.

10. A one stage first-in-first-out synchronizer as in claim 8:
wherein the first write logic gating means comprises:
a logic NOT gate having an input coupled to the output of the third write flip flop, and
a first logic XOR means having a first input coupled to an output of the logic NOT gate, a second input coupled to the write pointer, and an output which generates the not full output;
wherein the first read logic gating means comprises a second logic XOR gate having a first input coupled to the output of the third read flip-flop, a second input coupled to the read pointer, and an output which generates the not empty output;
wherein the second write logic gating means comprises a first logic AND gate having a first input coupled to the write input, a second input coupled to the not full output, and an output coupled to the input of the first write flip-flop; and,
wherein the second read logic gating means comprises a second logic AND gate having a first input coupled to the read input, a second input coupled to the not empty output, and an output coupled to the input of the first read flip-flop.

11. A one stage first-in-first-out synchronizer as in claim 8 additionally comprising:
a register including:
a data input,
a data output,
a clock input, coupled to the write clock input, and
a load input coupled to the input of the first write flip-flop.

12. A one stage first-in-first-out synchronizer as in claim 8 wherein the second read logic gating means is also for generating a load input to a register, the register being external to the one stage first-in-first-out synchronizer, the register also including, a data input, a data output, a clock input on which is placed the write clock signal.

13. A one stage first-in-first-out synchronizer, comprising:
a write input;
a not full output;
a read input;
a not empty output;
a first write flip-flop which generates a write pointer;
a first read flip-flop which generates a read pointer;
a second write flip-flop, which receives as input the read pointer;
a third write flip-flop, having an output coupled to the not full output;
a second read flip-flop, which receives as input the write pointer;
a third read flip-flop, having an output coupled to the not empty output;
a write clock input which provides a write clock signal to the first write flip-flop, the second write flip-flop and the third write flip-flop;
first write logic gating means, for generating an input to the third output from an input to the first write flip-flop and an output of the second write flip-flop;
second write logic gating means for generating an input to the first write flip-flop from the write input the not full output and the write pointer;
a read clock input which provides a read clock signal to the first read flip-flop, the second read flip-flop and the third read flip-flop;
first read logic gating means, for generating an input to the third flip-flop from an input of the first flip-flop and an output of the second read flip-flop; and,
second read logic gating means for generating an input to the first read flip-flop from the read input, the not empty output and the read pointer.

14. A one stage first-in-first-out synchronizer as in claim 13 wherein:
the first write flip-flop is a delay (D) flip-flop;
the second write flip-flop is a D flip-flop;
the third write flip-flop is a D flip-flop;
the first read flip-flop is a D flip-flop;
the second read flip-flop is a D flip-flop; and
the third read flip-flop is a D flip-flop.

15. A one stage first-in-first-out synchronizer as in claim 13:
wherein the first write logic gating means comprises:
a logic NOT gate having an input coupled to the output of the second write flip flop, and a first logic XOR means having a first input coupled to an output of the logic NOT gate, a second input coupled to the input of the first write flip-flop, and an output coupled to the input of the third write flip-flop;

wherein the first read logic gating means comprises a second logic XOR gate having a first input coupled to the output of the third read flip-flop, a second input coupled to the input of the first read flip-flop, and an output coupled to the input of the third read flip-flop;

wherein the second write logic gating means comprises:
    a first logic AND gate having a first input coupled to the write input and a second input coupled to the not full output, and
    a third logic XOR gate having a first input coupled to an output of the first logic AND gate, a second input coupled to the write pointer and an output coupled to the input of the first write flip-flop; and, wherein the second read logic gating means comprises:
    a second logic AND gate having a first input coupled to the read input and a second input coupled to the not empty output, and
    a fourth logic XOR gate having a first input coupled to an output of the second logic AND gate, a second input coupled to the read pointer and an output coupled to the input of the first read flip-flop.

16. A one stage first-in-first-out synchronizer as in claim 15 additionally comprising:
    a register including:
        a data input,
        a data output,
        a clock input, coupled to the write clock input, and
        a load input coupled to the output of the first logic AND gate.

17. A one stage first-in-first-out synchronizer as in claim 15 wherein the output of the first logic AND gate is coupled to a load input to a register, the register being external to the one stage first-in-first-out synchronizer, the register also including, a data input, a data output, a clock input on which is placed the write clock signal.

18. A one stage first-in-first-out synchronizer, 2 comprising:

a producer side comprising:
    a first write buffer which stores a write pointer,
    a not full output which indicates whether new data may be written,
    a write input which is asserted to write data,
    a second write buffer which receives as input a read pointer, and
    a write clock input used to provide a clock signal to the first write buffer and the second write buffer; and, a consumer side comprising:
    a first read buffer which stores the read pointer,
    a not empty output which indicates whether stored data may be read,
    a read input which is asserted to read data,
    a second read buffer, which receives as input the write pointer, wherein the second read buffer is separate from and not part of the second write buffer, and
    a read clock input used to provide a clock signal to the first read buffer and the second read buffer.

19. A one stage first-in-first-out synchronizer, comprising:

a producer side comprising:
    a first write buffer which stores a write pointer,
    a not full output which indicates whether new data may be written,
    a write input which is asserted to write data,
    a second write buffer which receives as input a read pointer, and
    a write clock input used to provide a clock signal to the first write buffer and the second write buffer; and, a consumer side comprising:
    a first read buffer which stores the read pointer,
    a not empty output which indicates whether stored data may be read,
    a read input which is asserted to read data,
    a second read buffer, which receives as input the write pointer, and
    a read clock input used to provide a clock signal to the first read buffer and the second read buffer;

wherein the second write buffer comprises two cascaded flip-flops, and the second read buffer comprises two cascaded flip-flops.

20. A one stage first-in-first-out synchronizer as in claim 19 additionally comprising:
    a register including:
        a data input,
        a data output,
        a clock input, coupled to the write clock input, and
        a load input coupled to an input of the first write buffer.

* * * * *

UNITED STATES PATENT AND TRADEMARK OFFICE
CERTIFICATE OF CORRECTION

PATENT NO.    : 6,208,703 B1
DATED         : March 27, 2001
INVENTOR(S)   : Vincente V. Cavanna et al.

It is certified that error appears in the above-identified patent and that said Letters Patent is hereby corrected as shown below:

Column 7,
Line 43, delete "Fig. 5" and insert therefor -- Fig. 6 --

Column 9,
Line 28, "Data in 212" should begin a new paragraph

Column 12,
Line 66, delete "generat ing" and insert therefor -- generating --

Column 15,
Line 42, after "synchronizer," delete "2"

Signed and Sealed this

Twelfth Day of November, 2002

Attest:

Attesting Officer

JAMES E. ROGAN
Director of the United States Patent and Trademark Office